(12) United States Patent
Feklistov et al.

(10) Patent No.: US 9,028,110 B2
(45) Date of Patent: May 12, 2015

(54) VISUAL WARNING DEVICE

(75) Inventors: Dmitri Feklistov, Adelaide (AU);
Oksana Feklistova, legal representative,
West Lakes Shores (AU); Michael Gillyon, Adelaide (AU)

(73) Assignee: The Commonwealth of Australia, Adelaide S.A. (AU)

( * ) Notice: Subject to any disclaimer, the term of this patent is extended or adjusted under 35 U.S.C. 154(b) by 636 days.

(21) Appl. No.: 13/384,282

(22) PCT Filed: Jul. 16, 2010

(86) PCT No.: PCT/AU2010/000910
§ 371 (c)(1),
(2), (4) Date: Apr. 17, 2012

(87) PCT Pub. No.: WO2011/006211
PCT Pub. Date: Jan. 20, 2011

(65) Prior Publication Data
US 2012/0206922 A1      Aug. 16, 2012

(30) Foreign Application Priority Data
Jul. 17, 2009   (AU) ................................ 2009903348

(51) Int. Cl.
| | |
|---|---|
| F21V 5/00 | (2006.01) |
| G02B 27/09 | (2006.01) |
| G08B 5/36 | (2006.01) |
| G02B 19/00 | (2006.01) |

(52) U.S. Cl.
CPC .............. *G02B 27/0927* (2013.01); *G08B 5/36* (2013.01); *G02B 19/0057* (2013.01); *G02B 19/0014* (2013.01)

(58) Field of Classification Search
CPC ............ G02B 19/0014; G02B 19/0057; G02B 27/0927; G08B 5/36
USPC ............... 362/109, 259, 268, 311.02, 311.12, 362/331, 343
See application file for complete search history.

(56) References Cited

U.S. PATENT DOCUMENTS

| | | | |
|---|---|---|---|
| 4,453,806 A * | 6/1984 | Wick ........................... | 359/707 |
| 5,373,395 A | 12/1994 | Adachi | |
| 6,007,218 A | 12/1999 | German et al. | |
| 6,799,868 B2 | 10/2004 | Brown et al. | |
| 6,867,929 B2 | 3/2005 | Lopez-Hernandez et al. | |

(Continued)

OTHER PUBLICATIONS

Jackson et al., "Lasers are Lawful as Non-Lethal Weapons", The Army Lawyer, Department of the Army Pamphlet 27-50-399, Aug. 2006, 12-18.

(Continued)

*Primary Examiner* — Stephen F Husar
(74) *Attorney, Agent, or Firm* — Baker & Hostetler LLP

(57) ABSTRACT

An optical device for providing a visual warning indication is disclosed. The optical device includes a high intensity localized light source such as a laser diode and a diffuser for modifying a beam intensity distribution of the emitted light from the high intensity localized light source to generate diffused light. The device further includes a collimator for collimating the diffused light from the diffuser to provide collimated light for emission from an output aperture to provide the visual warning indication. The beam intensity distribution of the emitted light is modified by the diffuser to generate a substantially uniform intensity distribution of the collimated light over the entire output aperture.

16 Claims, 4 Drawing Sheets

(56) References Cited

U.S. PATENT DOCUMENTS

| | | |
|---|---|---|
| 7,040,780 B2 | 5/2006 | Diehl |
| 7,061,690 B1 | 6/2006 | Berger |
| 7,072,543 B2 | 7/2006 | Pierce et al. |
| 7,232,240 B2 | 6/2007 | Kosnik et al. |
| 7,239,655 B2 | 7/2007 | Casazza |
| 2002/0154498 A1 | 10/2002 | Cramer et al. |
| 2005/0279205 A1 | 12/2005 | Rode |
| 2006/0066870 A1 | 3/2006 | Korngut et al. |
| 2007/0274075 A1 | 11/2007 | Nagamune |
| 2007/0274353 A1 | 11/2007 | Hauck et al. |
| 2011/0102748 A1* | 5/2011 | Shevlin et al. .......... 353/38 |

OTHER PUBLICATIONS

Dennis et al., "Visual Effects Assessment of the Green Laser-Baton Illuminator (GLBI)", www.ncjrs.gov/pdffiles1/nij/grants/189571.pdf, May 2001, 25 pages.

Laser Institute of America, "American National Standard for Safe Use of Lasers", ANSI ZI36.1-2007, Mar. 16, 2007, 22 pages.

* cited by examiner

VISUAL WARNING DEVICE

CROSS-REFERENCE TO RELATED APPLICATIONS

This application is the National Stage of International Application No. PCT/AU2010/000910, filed Jul. 16, 2010, which claims the benefit of Australian Provisional Application No. 2009903348, filed Jul. 17, 2009, the disclosures of which are incorporated herein by reference in their entireties.

TECHNICAL FIELD

The present invention relates to a warning device. In a particular form, the present invention relates to an optical device for providing a visual warning indication.

BACKGROUND

Often it is necessary to provide a visual warning indication to indicate either the presence of a particular hazard, gain a person's attention or warn someone away from a given area. In many instances, a large intense light source such as a spotlight or other warning device may be used that is attached to a support structure and powered from a separate power supply. However, in many instances there is the requirement for a handheld or manually operable device having similar dimensions to a torch or the like which can be carried or alternatively attached to another manually operable piece of equipment.

One example of such a requirement would involve a security guard monitoring a checkpoint to prevent the entry of unauthorised vehicles or persons to a location. In this scenario, a security guard, who will typically be on foot, will often need to provide a visual warning indication to alert the driver of a vehicle or other persons approaching the checkpoint to stop or otherwise slow down. While commonly a standard handheld torch is used, these devices often cannot be seen, especially in bright ambient conditions or in those environmental conditions where there may be dust due to weather conditions or background smoke or haze. In addition, where vehicles may be moving at speed then the visual warning indication needs to be visible from distances of at least two to three hundred meters to function effectively. To address this deficiency of standard hand held illumination devices, a number of laser based warning devices have been developed.

Laser based devices however, suffer from a number of serious disadvantages. While these devices are clearly able to provide an intense visual indication, they typically share the common problem that within a certain distance from the device (e.g. up to 100 meters) they are no longer eye-safe. This means that a person exposed to the visual warning indication emitted by the device is likely to suffer from eye damage. Not only does this present a hazard to the person being warned but in addition the operator of the warning device must take extensive precautions not to accidentally illuminate themselves or anyone else within the hazard range of the device. This problem of laser based devices is in large part due to their point source nature resulting in the power of the visual warning indication being tightly focused on the retina, thereby resulting in damage to the ocular system.

In one attempt to address this problem of current laser based systems, the laser intensity is simply reduced to an eye-safe level by reducing the power of the laser employed. However, this results in a reduced effective range for the warning device. Another attempt to make these devices eye-safe involves reducing the fraction of total laser power which can be can be captured by the fully opened iris of the eye in normal operation conditions. This is achieved by expanding the effective size of the laser beam at the output aperture of the device. However, this involves the introduction of bulky optical elements which increases the overall weight and bulkiness of the visual warning device, thereby detracting from the ease of use of the device.

Other more complicated designs have attempted to use multiple point laser sources each of lesser intensity resulting in complicated optical arrangements that add extra cost and size to the device. In yet another attempt to produce a compact eye-safe visual warning device, some devices employ an extended laser source by degrading the laser beam quality by the insertion of an optical element which functions to blur the focal spot. However, this once again increases the size of the output optics. There is accordingly a need for an optical device for providing a visual warning indication that is relatively compact and that may be used in a range of circumstances.

SUMMARY

In a first aspect the present invention accordingly provides an optical device for providing a visual warning indication, the optical device including:
  a high intensity localised light source for emitting light;
  a diffuser for modifying a beam intensity distribution of the emitted light from the high intensity localised light source to generate diffused light; and
  a collimator for collimating the diffused light from the diffuser to provide collimated light for emission from an output aperture to provide the visual warning indication, wherein the beam intensity distribution of the emitted light is modified by the diffuser to generate a substantially uniform intensity distribution of the collimated light over the entire output aperture.

In another form, the high intensity localised light source is a laser light source for emitting laser light.

In another form, the diffuser is a top hat diffuser.

In another form, the top hat diffuser is based on a microlens array design.

In another form, the optical device is of a compact configuration suitable for manual operation.

In another form, the optical device is battery powered.

In another form, the laser light source is a laser diode source.

In another form, the emission wavelength of the laser light source is selected based on the expected operating conditions of the optical device.

In another form, the optical device further includes a small angle diffuser located between the diffuser and the collimator.

In a second aspect the present invention accordingly provides an optical device for providing a visual warning indication, the optical device including:
  a source means for emitting light;
  a diffusing means for modifying a beam intensity distribution of the emitted light from the light source to generate diffused light; and
  a collimating means for collimating the diffused light from the diffuser to provide collimated light for emission from an output aperture to provide the visual warning indication, wherein the beam intensity distribution of the emitted light is modified by the diffusing means to generate a substantially uniform intensity distribution of the collimated light over the entire output aperture.

In a third aspect the present invention accordingly provides a method for providing a visual warning, the method including:
    emitting light from a high intensity localised light source;
    diffusing emitted light from the high intensity localised light source to generate diffused light; and
    collimating the diffused light to provide collimated light for emission from an output aperture to provide the visual warning, wherein the step of diffusing includes modifying the beam intensity distribution of the emitted light to generate a substantially uniform intensity distribution of the collimated light over the entire output aperture.

In another form, the high intensity localised light source is a laser light source for emitting laser light.

In another form, the diffused light is generated by a top hat diffuser.

In another form, the top hat diffuser is based on a microlens array design.

In another form, the laser light source is a laser diode source.

In another form, the emission wavelength of the laser light source is selected based on the expected operating conditions of the optical device.

In another form, the diffused light is further diffused by a small angle diffuser prior to the step of collimating.

In a fourth aspect the present invention accordingly provides a visual warning device including:
    a laser light source for emitting laser light;
    a diffuser for modifying the beam intensity distribution of the laser light to generate diffused light having a modified beam intensity distribution incorporating a broad central region of substantially uniform intensity and further including a steep fall off in intensity at the sides of the broad central region;
    a collimator for collimating the diffused light to generate collimated light; and
    an output aperture for outputting collimated light from the collimator to provide the visual warning, wherein the collimated light has a substantially uniform intensity distribution over the entire output aperture.

In another form, the visual warning device includes a handle portion to provide for manual operation of the visual warning device.

In another form, the handle includes an actuator for turning on the laser light source.

BRIEF DESCRIPTION OF THE DRAWINGS

Illustrative embodiments will be discussed with reference to the accompanying drawings wherein.

In the following description, like reference characters designate like or corresponding parts throughout the several views of the drawings.

DETAILED DESCRIPTION

Figure 1:
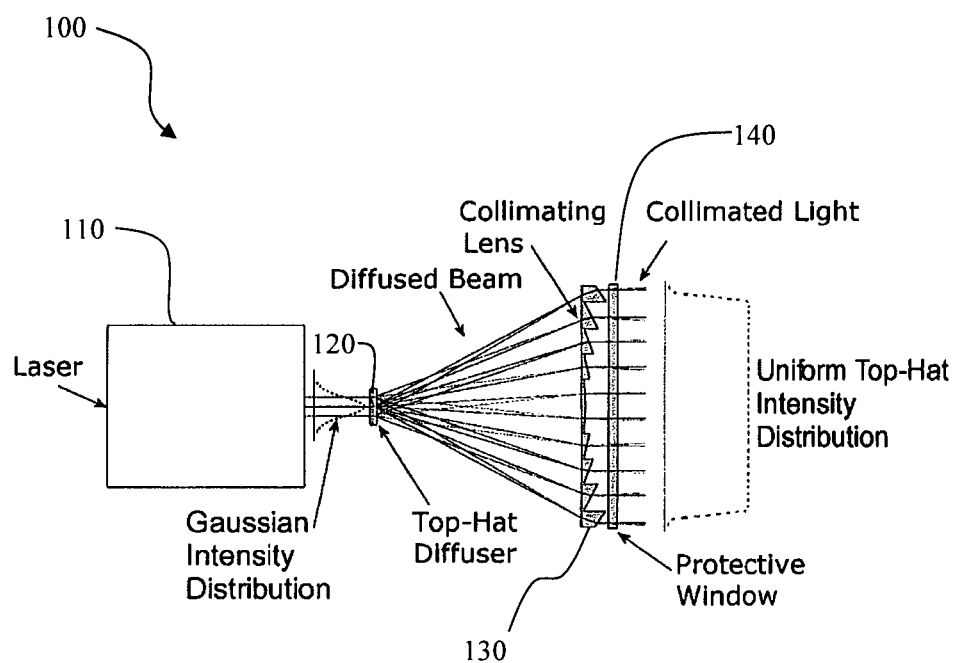
FIG. 1 is a schematic view of an optical device for providing a visual warning indication according to a first illustrative embodiment.

Referring now to FIG. 1, there is shown an optical device 100 for providing a visual warning indication in accordance with a first illustrative embodiment of the present invention. Optical device 100 includes a light source 110 which in this illustrative embodiment is a laser light source incorporating a diode pumped, frequency doubled $Nd:YVO_4$ laser. This type of laser emits laser light having a beam intensity distribution with a Gaussian profile at a wavelength of approximately 532 nm which as would be appreciated by those skilled in the art is close to the peak visual response wavelength of 555 nm for the human optical system.

One such example laser of this type is the Snake Creek Lasers' Minigreen™ which has a power output in the order of 150 mW. Alternatively, and depending on the circumstances and operating environment, other wavelengths of emitted light may be more appropriate and accordingly other laser diode arrangements including but not limited to sources such as red AlGaInP diodes which emit laser light having a wavelength of 630 nm and/or blue InGaN diodes which emit laser light having a wavelength of approximately 450 nm may be employed.

More generally, light source 110 may be any suitable type of laser capable of emitting in the visible range including, but not limited to, diode pumped solid state lasers or laser diodes. Laser diode sources such as those referred to above are attractive due to their very small volumes and high efficiency but generally would fall within the Class 3B classification. As such these devices would be expected to have intensities approximately 150 times the recognised limit for being eye safe (with aversion response) with even accidental exposures of a few microseconds still exceeding the recommended maximum permissible exposure (MPE).

Optical device 100 further includes a diffuser 120, a collimator 130 and an output aperture 140. In this illustrative embodiment, diffuser 120 consists of a Thorlabs ED1-C50 Engineered Diffuser™ which generates a 50° cone angle and functions to modify the beam intensity distribution of the emitted light from light source 110 to generate diffused light having a "top hat" beam intensity distribution which is characterised by a broad central region of substantially uniform intensity (i.e. varying less than approximately ±10%) having a steep almost perpendicular fall off in intensity at the sides of the broad central region, thereby approximating the shape of a top hat. The Thorlabs ED1-C50 Engineered Diffuser™ incorporates an array of microlenses having a variety of different sag profiles whose locations are optimised to reduce diffraction artefacts and zero order bright spots.

This appropriately modified diffused light as generated by diffuser 120 is incident on collimator 130 which collimates the divergent uniformly spread light from diffuser 120 hence resulting in a substantially uniform intensity distribution of the collimated laser light over the entire output aperture 140 which in this embodiment is a protective window. As depicted in FIG. 1, collimator 130 is a wide numerical aperture (NA) Fresnel lens but equally any other fast light collecting lens, including but not limited to, aspheric or Fresnel lenses are contemplated to be within the scope of the invention. In another illustrative embodiment, a Thorlabs AL5040-A aspheric lens is employed thereby negating the requirement for a separate protective window as the output aperture 140.

In this illustrative embodiment, the variation of intensity over the entire output aperture 140 is less than or of the order 25%. However, in other embodiments the variation in intensity may be lower with variations of less than 5%, 10% or 20% respectively or alternatively be higher with variations of intensity less than 30%, 35%, 40%, 45% or 50% respectively over the entire output aperture 140. While the variation in intensity will vary in accordance with requirements and depend on the arrangement, type and setup of the various components of optical device 100, and in particular diffuser 120, the levels of variation referred to above will appear to an observer as a substantially uniform intensity distribution of collimated light over the entire output aperture 140 especially as compared to an output beam having a standard Gaussian profile over the output aperture 140. As would be appreciated by those of ordinary skill in the art, minimising the variation in intensity will generally result in an increase in the total power that can be emitted by optical device 100 while retaining eye safety.

While in this illustrative embodiment diffuser 120 is a Thorlabs ED1-050 Engineered Diffuser™, in other embodiments diffuser 120 may include, but not be limited to, a micro-optic array, diffractive or refractive beam shaping elements, a structured surface diffuser or a series of closely spaced diffuser element or any combination thereof. In a further illustrative embodiment a second small angle diffuser 121 (i.e. having a diffusing angle of the order 0.5°) is inserted some distance in the optical train after diffuser 120 to blur details of any micro-structure in the emitted beam from diffuser 120. This microstructure may arise due to the local structure of the diffuser 120 thereby resulting in hot-spots in the apparent source. An example of such a small angle diffuser 121 is the Edmunds 47-989. In another illustrative embodiment, diffuser 120 may be a reflective element providing further flexibility in the optical train arrangement.

Optical device 100 in combination with associated drive circuitry is packaged in a black anodised aluminium housing which is water resistant. In this illustrative embodiment, optical device 100 is powered by two CR-123 lithium batteries which provide approximately 2 hours of operation, with an operating profile of 20 seconds on and 2 minutes off. The resulting package is approximately 100 mm in length with a 40 mm output aperture and weighs in the region of 250-600 grams.

The resulting emitted light exiting output aperture 140 has a power density of 110 W/m$^2$ and an apparent source subtense of 7 mrad. Accordingly, within a range of 6 meters, an observer looking into optical device 100 views a 7 mrad source as opposed to a point source that would normally be associated with a laser light source. This implies that the focus spot on the retina is significantly larger and correspondingly safer. Between 6 and 27 meters the apparent source subtense is gradually reduced. For 27 meters and beyond, the 40 mm output aperture 140 of optical device 100 subtends a small enough angle so that it is effectively considered a point source again. In this extended distance regime, the apparent brightness of the source, and therefore its effectiveness as a visual warning indication, becomes dependant only upon the exiting beam divergence and the total power contained in the emitted laser light and is therefore the same as any other device of the same power and divergence. In field testing, the embodiment described above has been shown to be effective beyond 200 meters under ambient illumination conditions exceeding 100,000 lux.

The beam characteristics of the emitted laser light referred to above of optical device 100 places it at 94% of the Class 2M exposure limit according to laser safety standards (see for example AS/NZS 2211.1:2004 or IEC 60825.1:2007). Class 2M lasers are considered appropriately safe for general use and the associated recommended procedures and precautions for safe operation are relatively minor. As would be appreciated by those skilled in the art, if the same beam power was delivered from a simple laser pointer the exposure would be approximately 150 times the Class 2M exposure limit and hence would pose a significant ocular hazard.

By way of comparison, if in this illustrative embodiment the same source beam power was expanded using a lens based telescope arrangement to 40 mm diameter the exposure at the output aperture 140 would be 8.4 times over the Class 2M limit. This is due to the laser beam still forming a point source on the retina and the intensity peak of the Gaussian distribution. If the same beam power was expanded to 40 mm using a conventional Gaussian diffuser then the exposure at the aperture would still be 1.8 times over the Class 2M exposure limit due to the increased peak intensity at the centre of the Gaussian distribution. As would be appreciated by those of ordinary skill in the art, the output aperture 140 may be vary in size in accordance with requirements and would include, but not be limited to, ranges of 10-15 mm, 15-20 mm, 20-25 mm, 25-30 mm, 30-35 mm, 35-40 mm, 40-45 mm, 45-50 mm, 50-55 mm, 55-60 mm, 60-65 mm, 65-70 mm, 70-75 mm, 75-80 mm, 80-85 mm, 85-90 mm, 90-95 mm or 95-100 mm.

Figure 2:
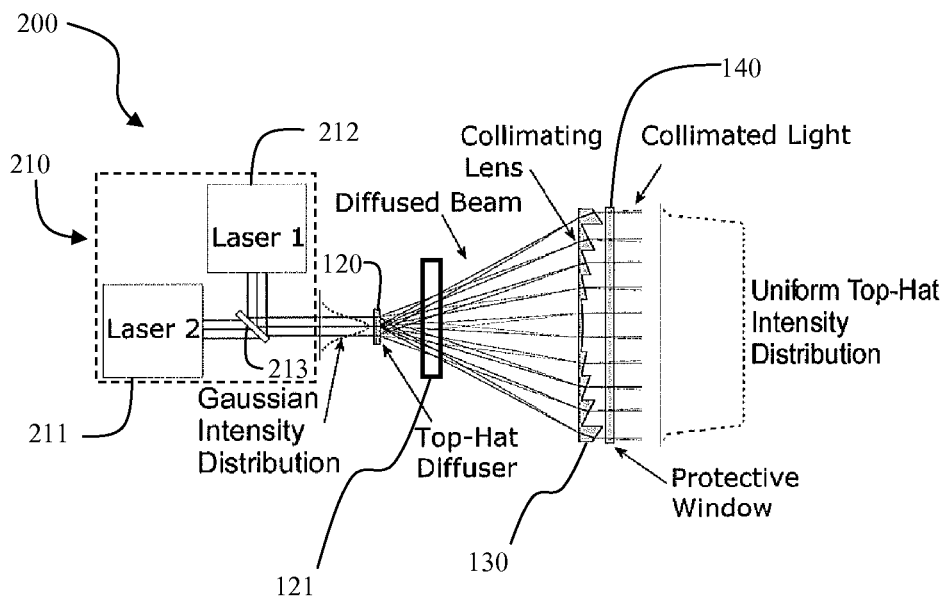
FIG. 2 is a schematic view of an optical device for providing a visual warning indication according to a second illustrative embodiment.
Figure 3:
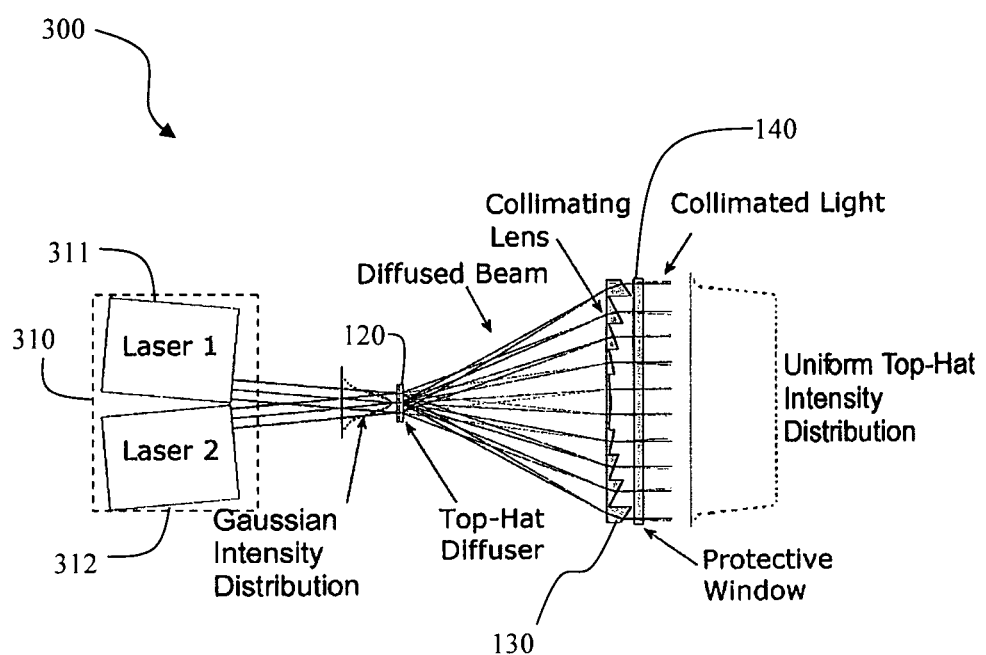
FIG. 3 is a schematic view of an optical device for providing a visual warning indication according to a third illustrative embodiment.

Referring now to FIG. 2, there is shown an optical device 200 for providing a visual warning indication in accordance with a second illustrative embodiment of the present invention where laser light source 210 includes two laser devices 211, 212 whose emitted laser light is combined by the use of beam splitter 213. The combined emitted laser light is then arranged to be incident on diffuser 120 as described previously. Similarly, in FIG. 3, there is shown an optical device 300 for providing a visual warning indication in accordance with a third illustrative embodiment where again the laser light source 310 involves two laser devices 311, 312. However, in this illustrative embodiment the emitted light from each of the laser devices is arranged to be generally emitted in the same direction to be incident on diffuser 120. By using multiple lasers the visual warning indication can be customised as required, for example to allow selection of a red or green beam, or to extend the operational temperature range by utilising lasers optimised for hot and cold conditions.

Figure 4:
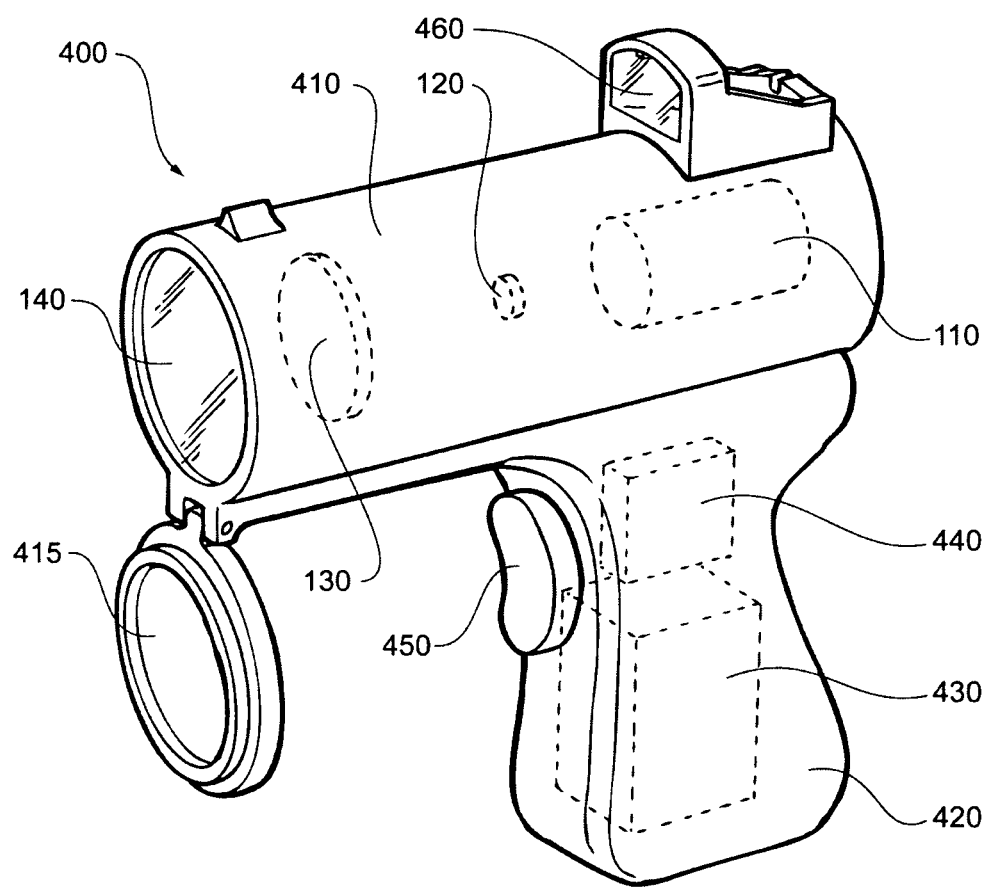
FIG. 4 is a figurative perspective view of a compact configuration version of an optical device for providing a visual warning indication according to a fourth illustrative embodiment that is suitable for manual operation.

Referring now to FIG. 4, there is shown figuratively a compact configuration version of an optical device 400 for providing a visual warning indication according to a fourth illustrative embodiment that is particularly suitable for manual operation. In this illustrative embodiment, optical device 400 includes a main body or housing 410 housing the optical assembly that includes the light source 110 which again in this illustrative embodiment is a laser light source, the diffuser 120 and the collimator 130. Housing 410 also includes a circular output aperture 140 which in this case further includes a protective window. Optical device 400 also includes a removable protective cap 415 which in this illustrative embodiment is attached to the housing 410 by a hinge arrangement allowing the protective cap 415 to be conveniently removed from and replaced to cover output aperture 140.

Optical device 400 also includes a handle portion 420 which in this illustrative embodiment includes a trigger actuator 450 to turn on or activate optical device 400. Trigger actuator 450 may be of the momentary action type or the more conventional off-on variety. Handle portion 420 houses the battery power supply 430 and the control electronics 440 for the laser 110 having as inputs the outputs from trigger actuator 450 and battery power supply 430. In other embodiments, the battery power supply 430 and control electronics may be integrated into laser 110. Battery power supply 430 may be rechargeable having a power input connector (not shown) to receive an external power lead to recharge battery power supply. As would be appreciated by those of ordinary skill in the art, the pistol grip arrangement of the handle portion 420 of optical device 400 readily allows for manual pointing and activation. Handle portion 420 may be formed with a resilient gripping surface to further facilitate handling of optical device 400.

In this illustrative embodiment, optical device 400 further includes a detachable sight 460 which may be used as an aid to precisely orientate optical device 400 when providing a visual warning indication to persons who may be located at some distance. In this illustrative embodiment, sight 460 is a JPoint™ micro-electronic reflex sight having a weight of approximately 15 grams making it particularly suitable for this manually operable configuration. In other embodiments, sight 460 may be of the more traditional telescopic variety. Other embodiments of optical device 400 include a standard torch like cylindrical housing such as described with reference to FIG. 1 above, which itself may be removably attached or mounted to other articles as required.

As would be apparent to one of ordinary skill in the art, an optical device in accordance with the illustrative embodiments described herein can provide an exceptionally compact and lightweight non-lethal laser device capable of delivering bright laser light up to few hundred meters while being inherently safe at all ranges. The compact and lightweight configuration of the optical device allows the device to be hand held and conveniently manually operable and furthermore allows for the easy integration with hand-held weapons such as rifles and the like by the incorporation of suitable mounting arrangements.

While the various embodiments referred to above are based on laser source arrangements, equally the present invention can have applicability to other high intensity localised light sources such as high powered light emitting diodes (LED) having an emitter area of the order of 1 mm² or less which otherwise would not be eye-safe without suitable modification in accordance with the present invention It will be understood that the term "comprise" and any of its derivatives (eg. comprises, comprising) as used in this specification is to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

Although illustrative embodiments have been described in the foregoing detailed description, it will be understood that the invention is not limited to the embodiments disclosed, but is capable of numerous rearrangements, modifications and substitutions without departing from the scope of the invention as set forth and defined by the following claims.

The invention claimed is:

1. An optical device for providing a visual warning indication, the optical device including:
   a high intensity localized light source for emitting light;
   a diffuser for modifying a beam intensity distribution of the emitted light from the high intensity localized light source to generate diffused light, wherein the diffuser is a top hat diffuser based on a microlens array design; and
   a collimator for collimating the diffused light from the diffuser to provide collimated light for emission from an output aperture to provide the visual warning indication, wherein the beam intensity distribution of the emitted light is modified by the diffuser to generate a substantially uniform intensity distribution of the collimated light over the entire output aperture.

2. The optical device of claim 1, wherein the high intensity localized light source is a laser light source for emitting laser light.

3. The optical device of claim 1, wherein the optical device is of a compact configuration suitable for manual operation.

4. The optical device of claim 1, wherein the optical device is battery powered.

5. The optical device of claim 2, wherein the laser light source is a laser diode source.

6. The optical device of claim 2, wherein the emission wavelength of the laser light source is selected based on the expected operating conditions of the optical device.

7. The optical device of claim 1, wherein the optical device further includes a small angle diffuser located between the diffuser and the collimator.

8. An optical device for providing a visual warning indication, the optical device including:
   a source means for emitting light;
   a diffusing means for modifying a beam intensity distribution of the emitted light from the light source to generate diffused light, wherein the diffusing means is a top hat diffuser based on a microlens array design; and
   a collimating means for collimating the diffused light from the diffuser to provide collimated light for emission from an output aperture to provide the visual warning indication, wherein the beam intensity distribution of the emitted light is modified by the diffusing means to generate a substantially uniform intensity distribution of the collimated light over the entire output aperture.

9. A method for providing a visual warning, the method including:
   emitting light from a high intensity localized light source;
   diffusing emitted light from the high intensity localized light source to generate diffused light wherein the diffused light is generated by a top hat diffuser based on a microlens array design; and
   collimating the diffused light to provide collimated light for emission from an output aperture to provide the visual warning, wherein the step of diffusing includes modifying the beam intensity distribution of the emitted light to generate a substantially uniform intensity distribution of the collimated light over the entire output aperture.

10. The method for providing a visual warning of claim 9, wherein the high intensity localized light source is a laser light source for emitting laser light.

11. The method of providing a visual warning of claim 10, wherein the laser light source is a laser diode source.

12. The method of providing a visual warning of claim 9, wherein the emission wavelength of the laser light source is selected based on the expected operating conditions of the optical device.

13. The method of providing a visual warning of claim 9, wherein the diffused light is further diffused by a small angle diffuser prior to the step of collimating.

14. A visual warning device including:
   a laser light source for emitting laser light;
   a diffuser for modifying the beam intensity distribution of the laser light to generate diffused light having a modified beam intensity distribution incorporating a broad central region of substantially uniform intensity and further including a steep fall off in intensity at the sides of the broad central region, wherein the diffuser is a top hat diffuser based on a microlens array design;

a collimator for collimating the diffused light to generate collimated light; and an output aperture for outputting collimated light from the collimator to provide the visual warning, wherein the collimated light has a substantially uniform intensity distribution over the entire output aperture.

15. The visual warning device of claim 14, wherein the visual warning device includes a handle portion to provide for manual operation of the visual warning device.

16. The visual warning device of claim 15, wherein the handle includes an actuator for turning on the laser light source.

* * * * *